3,015,659
DIALKYLAMINOETHYL PIPERAZINEPROPIO-
NATES AND PROCESS
Kurt J. Rorig, Glenview, Ill., assignor to G. D. Searle &
Co., Chicago, Ill., a corporation of Delaware
No Drawing. Filed Apr. 8, 1960, Ser. No. 20,830
7 Claims. (Cl. 260—268)

This invention relates to dialkylaminoalkyl piperazine-alkanoates and a process for the manufacture thereof. More particularly, this invention relates to chemical compounds of the formula

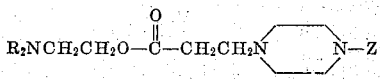

wherein R represents an alkyl radical and Z represents an alkyl, hydroxyalkyl, alkoxycarbonyl, or phenyl radical.

Among the alkyl radicals represented by R and Z, especially lower alkyl radicals are preferred, which is to say methyl, ethyl, propyl, isopropyl, butyl, isobutyl, sec-butyl, tert-butyl, pentyl, isopentyl, tert-pentyl, neopentyl, hexyl, isohexyl, heptyl, octyl, and like $C_nH_{2n+1}$ radicals wherein $n$ is a positive integer amounting to less than 9.

The hydroxyalkyl and alkoxycarbonyl radicals represented by Z likewise are most desirably of lower order, such radicals being those of the formulas and 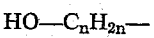

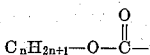

respectively, $n$ in the latter two formulas being defined as before.

Equivalent to the foregoing basic esters for the purposes of this invention are the corresponding acid addition salts of the formula

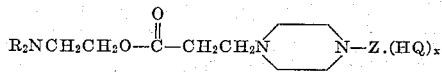

wherein R and Z have the meanings previously assigned; Q represents one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in physiological dosage; and $x$ represents a positive integer amounting to less than 4.

The compounds to which this invention relates are useful because of their valuable pharmacological properties. Thus, for example, they depress the central nervous system; they are anti-fungal agents representatively effective against Trichophyton mentagrophytes; and they inhibit the heat, swelling, and redness characteristic of the inflammatory response to tissue injury.

Manufacture of the subject compounds proceeds by heating a selected piperazine of the formula

with a di(lower alkyl)aminoethyl acrylate

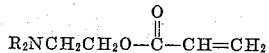

in an inert solvent, such as butanone, Z and R in the latter two formulas remaining as before. Conversion of the basic esters so produced to acid addition salts is accomplished by admixture with 1, 2, or 3 equivalents of inorganic and strong organic acids, the anionic portions of which conform to Q as hereinabove set forth.

The following examples describe in detail compounds illustrative to the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

Example 1

2-diethylaminoethyl 4-methyl-1-piperazinepropionate trihydrochloride.—A solution of 100 parts of N-methylpiperazine and 171 parts of 2-diethylaminoethyl acrylate in 2500 parts of butanone is heated at the boiling point under reflux for 9 hours. The resultant solution is diluted with 2000 parts of anhydrous ether and then made barely acid with a solution of hydrogen chloride in absolute 2-propanol. Upon standing, 2-diethylaminoethyl 4-methyl-1-piperazinepropionate trihydrochloride precipitates as a white crystalline solid which, recrystallized from methanol, melts at 235–237° with decomposition. The product has the formula

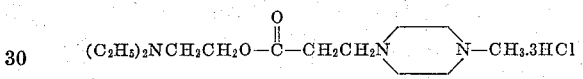

Example 2

2-dimethylaminoethyl 4-ethyl-1-piperazinepropionate.—A solution of 114 parts of N-ethylpiperazine and 143 parts of 2-dimethylaminoethyl acrylate in 2500 parts of butanone is heated at the boiling point under reflux for 9 hours. Solvent is removed by distillation in vacuo, affording 2-dimethylaminoethyl 4-ethyl-1-piperazinepropionate as the residue, a golden oil. The product has the formula

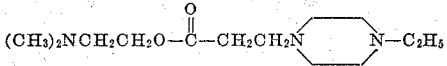

Example 3

2-diethylaminoethyl 4-(2-hydroxyethyl)-1-piperazinepropionate trihydrochloride.—A solution of 130 parts of 1-piperazineethanol and 171 parts of 2-diethylaminoethyl acrylate in 2500 parts of butanone is heated at the boiling point under reflux for 9 hours. Upon introduction of just sufficient hydrogen chloride dissolved in absolute 2-propanol to induce acidity, solid 2-diethylaminoethyl 4-(2-hydroxyethyl)-1-piperazinepropionate trihydrochloride is precipitated. The product, recovered on a filter and recrystallized from ethanol, melts at approximately 230–231° with decomposition. It has the formula

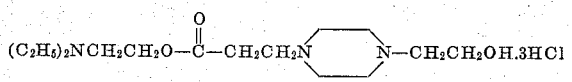

Example 4

2-dimethylaminoethyl 4-(3-hydroxypropyl)-1-piperazinepropionate.—A solution of 144 parts of 1-piperazinepropanol and 143 parts of 2-dimethylaminoethyl acrylate in 2500 parts of butanone is heated at the boiling point under reflux for 8 hours. Removal of solvent by vacuum distillation leaves as the residue, 2-dimethylaminoethyl 4-(3-hydroxypropyl)-1-piperazinepropionte, an oil. The product has the formula

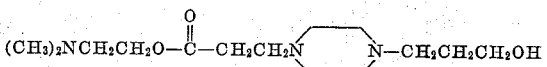

Example 5

*2-diethylaminoethyl 4-ethoxycarbonyl-1-piperazinepropionate dihydrochloride.*—Substitution of 158 parts of N-ethoxycarbonylpiperazine for the 1-piperazineethanol called for in Example 3 affords, by the procedure there detailed, 2-diethylaminoethyl 4-ethoxycarbonyl-1-piperaazinepropionate dihydrochloride as a colorless crystalline solid melting at approximately 228–229° (with decomposition) after recrystallization from ethanol. The product has the formula

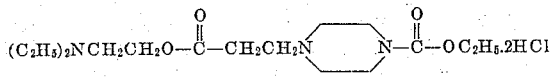

Example 6

*2-diethylaminoethyl 4-phenyl-1-piperazinepropionate dihydrochloride.*—Substitution of 162 parts of N-phenylpiperazine for the N-methylpiperazine called for in Example 1 affords, by the procedure there detailed, 2-diethylaminoethyl 4-phenyl-1-piperazine propionate dihydrochloride which, recrystallized from ethanol, is obtained as a white powder melting at 210–212°. The product has the formula

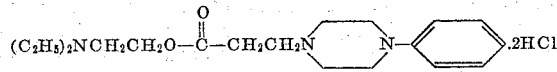

What is claimed is:
1. A compound of the formula

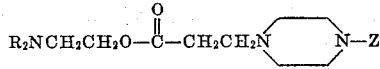

wherein R represents a lower alkyl radical and Z represents a member of the group consisting of lower alkyl, hydroxy-(lower alkyl), ethoxycarbonyl, and phenyl radicals.

2. A compound of the formula

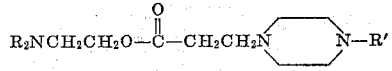

wherein R and R' represent lower alkyl radicals.

3. 2-diethylaminoethyl 4-methyl-1-piperazineprionate.

4. A compound of the formula

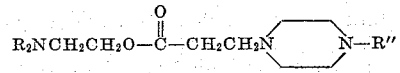

wherein R represents a lower alkyl radical and R" represents a hydroxy(lower alkyl) radical.

5. 2-diethylaminoethyl 4 - (2 - hydroxyethyl)-1-piperazinepropionate.

6. 2-diethylaminoethyl 4-ethoxycarbonyl-1-piperazinepropionate.

7. 2-diethylaminoethyl 4 - phenyl-1-piperazinepropionate.

References Cited in the file of this patent
UNITED STATES PATENTS
2,617,803     Turner _____ Nov. 11, 1952

OTHER REFERENCES

Pollard et al.: Jour. Amer. Chem Soc., vol. 75, pages 2989–2990 (1953).